US012771249B2

(12) United States Patent
Chen et al.

(10) Patent No.: US 12,771,249 B2
(45) Date of Patent: Oct. 20, 2026

(54) BOOST CONVERTER POWER STAGE CIRCUIT WITH DUAL POLARITY OUTPUT

(71) Applicant: National Taiwan University, Taipei (TW)

(72) Inventors: Ching-Jan Chen, Taipei City (TW); Chieh-Ju Tsai, Taipei City (TW); Sheng-Han Yu, Taipei City (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 155 days.

(21) Appl. No.: 18/796,925

(22) Filed: Aug. 7, 2024

(65) Prior Publication Data

US 2025/0350203 A1 Nov. 13, 2025

(30) Foreign Application Priority Data

May 10, 2024 (TW) ................................ 113117467

(51) Int. Cl.
*H02M 3/158* (2006.01)
*H02M 3/07* (2006.01)

(52) U.S. Cl.
CPC ............ *H02M 3/158* (2013.01); *H02M 3/07* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 5/2573; H02M 1/081; H02M 5/293; H02M 7/12; H02M 3/10; H02M 3/125;

(Continued)

(56) References Cited

U.S. PATENT DOCUMENTS 6,370,046 B1 * 4/2002 Nebrigic ................ H02M 3/07 363/59
9,595,871 B1 * 3/2017 Bayer ................ H02M 3/1582

(Continued)

FOREIGN PATENT DOCUMENTS

KR 101026995 B1 * 4/2011 ............ H02M 3/156

OTHER PUBLICATIONS

English Translation of KR101026995 b1 (Year: 2011).*

*Primary Examiner* — Crystal L Hammond
*Assistant Examiner* — Nusrat Quddus
(74) *Attorney, Agent, or Firm* — BACON & THOMAS, PLLC

(57) ABSTRACT

The present invention discloses a boost converter power stage circuit, an input voltage source is to provide power, and the input voltage source is electrically connected to a power stage ground component, comprising: a boost converter is electrically connected to an organic light-emitting diode power management integrated device, and the boost converter is electrically connected to the input voltage source to provide use of the organic light-emitting diode power management integrated circuit unit.

4 Claims, 4 Drawing Sheets

(58) Field of Classification Search
CPC ........ H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069
See application file for complete search history.

(56) References Cited

U.S. PATENT DOCUMENTS

| | | | | |
|---|---|---|---|---|
| 12,381,478 | B2* | 8/2025 | Wu | H02M 1/08 |
| 2020/0212704 | A1* | 7/2020 | Eftimie | H02J 7/92 |
| 2020/0295655 | A1* | 9/2020 | Takahiro | H02M 3/073 |
| 2021/0359606 | A1* | 11/2021 | Han | H02M 3/1586 |
| 2021/0376723 | A1* | 12/2021 | Jung | H02M 1/0045 |
| 2023/0155502 | A1* | 5/2023 | Qi | H02M 3/07<br>363/125 |
| 2025/0119995 | A1* | 4/2025 | Chen | H05B 45/35 |
| 2025/0357853 | A1* | 11/2025 | Ahn | H02M 3/07 |

* cited by examiner

BOOST CONVERTER POWER STAGE CIRCUIT WITH DUAL POLARITY OUTPUT

BACKGROUND OF THE INVENTION

1. Field of the Invention

The present invention relates to a boost converter power stage circuit, particularly to a boost converter power stage circuit that achieves dual-polarity output with only one inductor and has better transient response of output current.

2. Description of the Prior Art

Currently, smartphones often use active-matrix organic light-emitting diode (AMOLED) screens, which have two independent output voltages. However, the common problem is that due to the non-continuous current supply, the output efficiency of the entire output converter, control loop compensation, loop bandwidth, and transient response are quite poor.

Conventional output converters do not use single-inductor dual-polarity output converters, so that a better transient response converter is needed. The single-inductor dual-polarity output converter requires the use of multiple inductors to achieve dual-polarity output. Additionally, because the output voltage and output current are not continuous, the transfer function has right-half-plane zeros, which cannot produce a better transient response.

SUMMARY OF THE INVENTION

The present invention provides a boost converter power stage circuit that uses an input voltage source to provide power supply. The input voltage source is connected to the power stage grounding element, which includes an organic light-emitting diode (OLED) power management integrated circuit (IC) unit that provides power supply to OLEDs. The boost converter is connected to the OLED power management IC unit, a boost converter power stage circuit is electrically connected the input voltage source, which is a DC voltage source. The boost converter is used to provide two voltages, a positive voltage and a negative voltage, for use as the OLED power management IC unit. Wherein, the input voltage source is inputted to the boost converter, and then the output voltage is outputted. The voltage value of the output voltage is a positive driving voltage (ELVDD), which is higher than the input voltage source, and a negative output voltage, which is provided for use as the OLED power management IC unit.

An advantage of the present invention further comprises a power stage grounding element, and the power stage grounding element is electrically connected to the input voltage source.

An advantage of the present invention is that the boost converter further comprises: a first power switch; a second power switch; a third power switch; a flying capacitor; a fourth power switch; a fifth power switch; and an inductor. The inductor is electrically connected to the fourth power switch and the fifth power switch. Wherein, the second power switch is electrically connected to the flying capacitor and the fourth power switch, and the first power switch is electrically connected to the third power switch and the flying capacitor. The first power switch is grounded through the third power stage grounding element. Wherein, the flying capacitor is used to boost the inductor voltage to twice the voltage, so that the positive voltage of the output voltage is boosted, and the negative voltage is charged and discharged through the load capacitor to achieve the conversion negative voltage by using the output voltage.

An advantage of the present invention further comprises a first load capacitor and a second load capacitor. Wherein, the first load capacitor is electrically connected to the inductor, and the second load capacitor is electrically connected to the fifth power switch. The second load capacitor is grounded through the second power stage grounding element.

An advantage of the present invention is that when the duty cycle is closed, the first power switch is turned on, the second power switch is turned on, the third power switch is turned off, the fourth power switch is turned off, and the fifth power switch is turned on. The input voltage source outputs voltage through the flying capacitor, by charging the flying capacitor, and the second load capacitor provides inductance, boost the positive voltage of the output voltage, and to boost the voltage of the inductor to twice the voltage. The second load capacitor provides a negative driving voltage to the OLED power management IC unit.

An advantage of the present invention is that when the duty cycle is opened, the first power switch and the second power switch are turned off, the third power switch is turned on, the fourth power switch is turned on, and the fifth power switch is turned off. The input voltage source charges the first load capacitor through the flying capacitor, and the second load capacitor provides a negative driving voltage to the OLED power management IC unit.

An advantage of the present invention is that by using the flying capacitor to boost the inductor voltage to twice the voltage, the positive voltage is boosted, and another capacitor is used to obtain the conversion of the negative voltage. Therefore, the boost converter only needs to use an inductor to achieve bipolar output, and, to make the output current continuous. The transfer function has no right-half-plane zero, which can achieve better transient response compared to the conventional boost converters.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
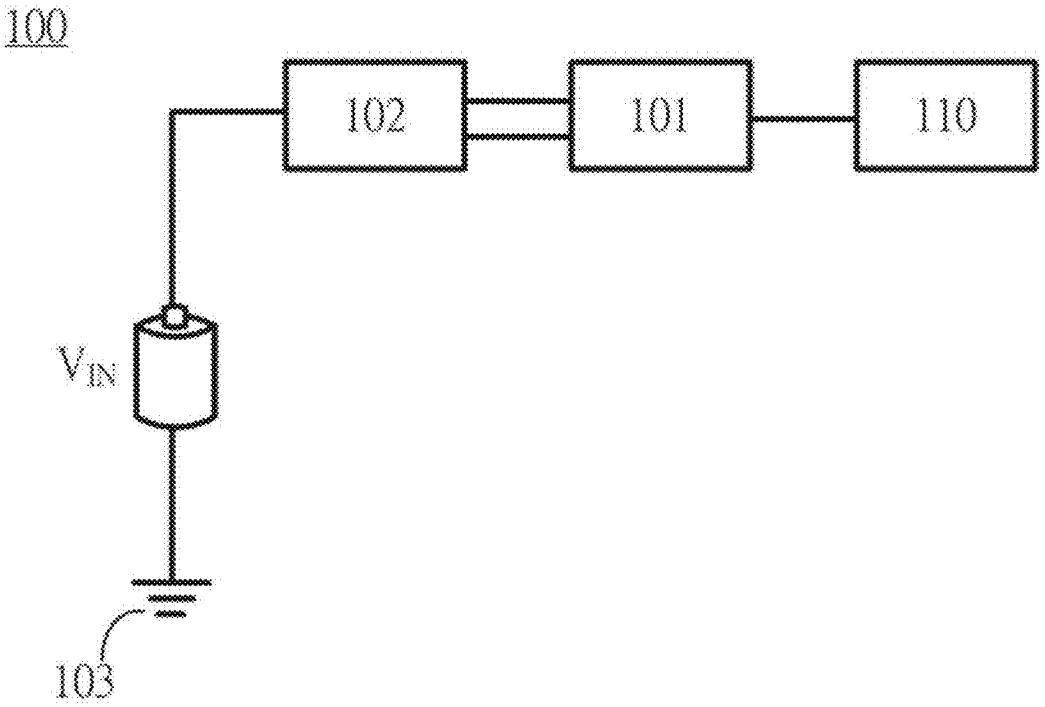
FIG. 1 is a block diagram of a boost converter power stage circuit according to the present invention.

Firstly, as shown in FIG. 1, the present invention provides a block diagram of a boost converter power stage circuit 100, also referred to as a boost converter power stage circuit 100, which uses the input voltage source $V_{IN}$ to provide power supply. The input voltage source $V_{IN}$ is electrically connected to the power stage ground component 103, which comprises: an organic light-emitting diode (OLED) power management integrated circuit (IC) unit 101 and a boost converter 102. The boost converter 102 is electrically connected to the organic light-emitting diode (OLED) power management integrated circuit (IC) unit 101, and electrically connected to the input voltage source $V_{IN}$. The input voltage source $V_{IN}$ is a direct current voltage source, and the boost converter 102 is used to provide a negative driving voltage (ELVSS) for the OLED power management integrated circuit (IC) unit 101. Furthermore, the boost converter power stage circuit 100 comprises a power stage ground component 103, and the power stage ground component 103 is electrically connected to the input voltage source $V_{IN}$ to provide a reference potential.

Figure 2:
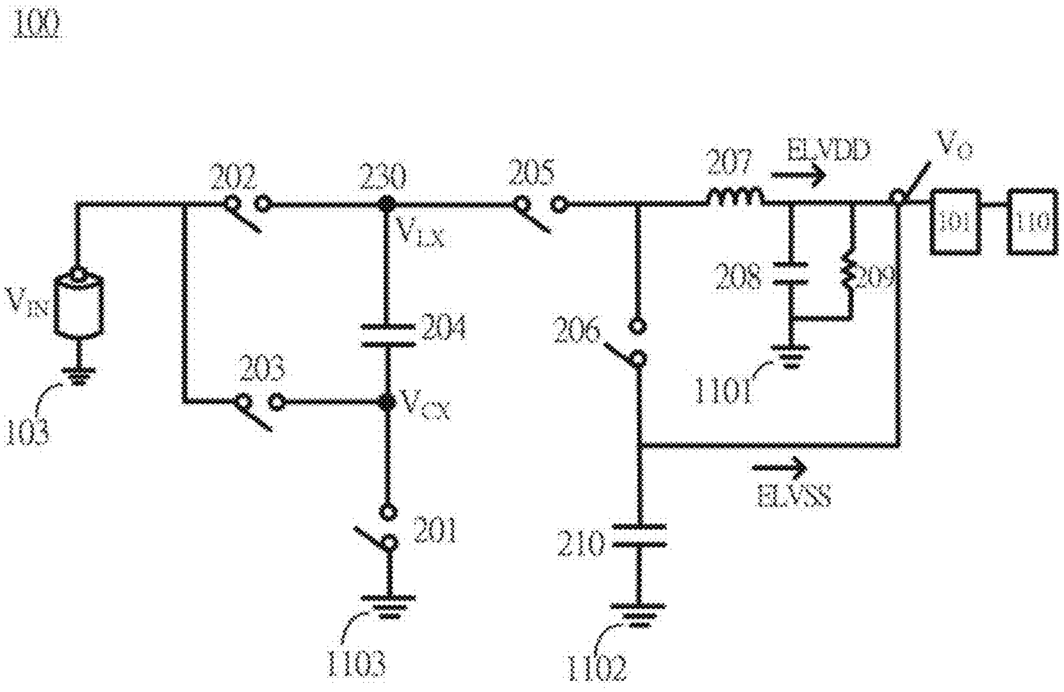
FIG. 2 is an architecture diagram of the boost converter power stage circuit of the present invention.

Refer to the architecture diagram of the boost converter 100 of the present invention shown in FIG. 2. The boost converter 102 comprises a first power switch 201, a second power switch 202, a third power switch 203, a flying capacitor 204, a fourth power switch 205, a fifth power switch 206, and an inductor 207. The inductor 207 is electrically connected to the fourth power switch 205, and the fifth power switch 206. Wherein, the second power switch 202 is electrically connected to the flying capacitor 204, and the fourth power switch 205. The first power switch 201 is electrically connected to the third power switch 203 and the flying capacitor 204, generating a voltage ($V_{CX}$). The first power switch 201 is grounded via the third power stage ground component 1103. The boost converter 100 circuit uses the flying capacitor 204 to boost the voltage of the inductor 207 to twice the voltage, boosting the positive voltage of the output voltage $V_o$. The second load capacitor 210 is used for charging and discharging, achieving the conversion of the negative voltage by using the output voltage $V_o$.

Still referring to the architecture diagram of the boost converter power stage circuit 100 of the present invention shown in FIG. 2, the boost converter power stage circuit 100 comprises a first load capacitor 208 and a second load capacitor 210. The first load capacitor 208 is electrically connected to the inductor 207, and the second load capacitor 210 is electrically connected to the fifth power switch 206, and the second load capacitor 210 is grounded via the second power stage ground component 1102.

Figure 3A:
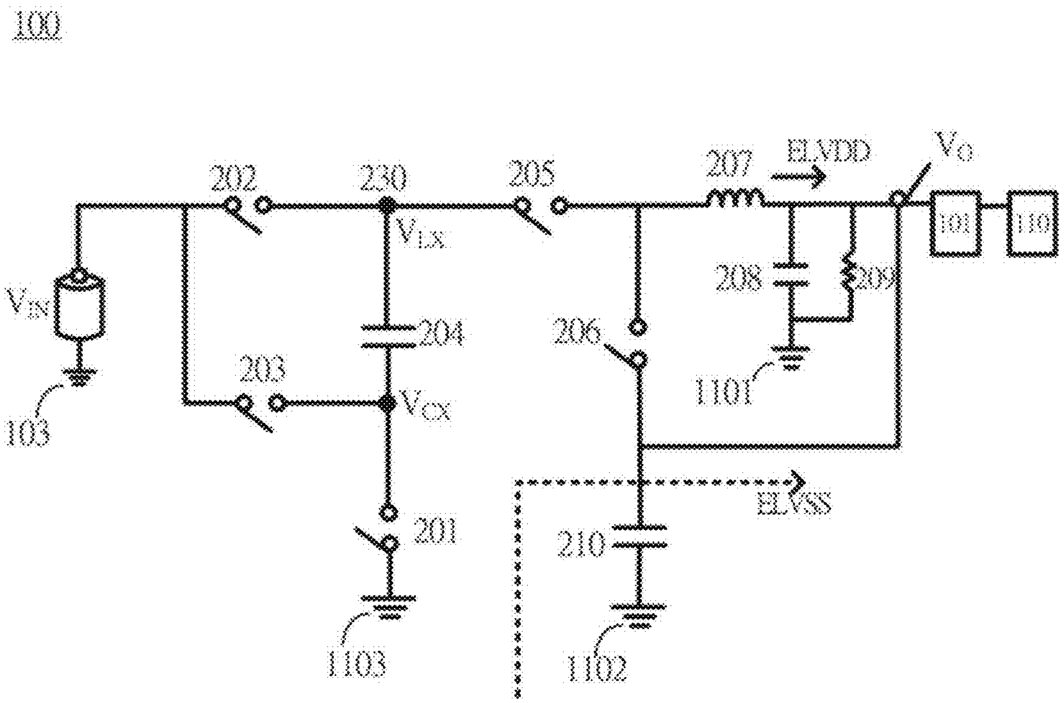
FIG. 3A is an architecture diagram of the boost converter power stage circuit of the present invention when the duty cycle is opened.

FIG. 3A shows the architecture diagram of the boost converter power stage circuit 100 of the present invention when the duty cycle is opened. When the duty cycle is closed, the first power switch 201 is turned on, the second power switch 202 is turned on, the third power switch 203 is turned off, the fourth power switch 205 is turned off, and the fifth power switch 206 is turned on. The input voltage source $V_{IN}$ outputs a voltage 230 ($V_{LX}$) through the flying capacitor 204. By charging the flying capacitor 204, the second load capacitor 210 provides a negative driving voltage (ELVSS) to the OLED power management integrated circuit (IC) unit 101 for boosting. By boosting the voltage of the inductor 207 to twice the voltage, the second load capacitor 210 provides the negative driving voltage to the organic light-emitting diode power management integrated circuit unit 101.

Please refer to FIG. 3A, which shows the architecture diagram of the boost converter 100 with single inductor bipolar output when the duty cycle is opened. When the duty cycle is opened, the first power switch 201 and the second power switch 202 are turned off, the third power switch 203 is turned on, the fourth power switch 205 is turned on, and the fifth power switch 206 is turned off. The input voltage source $V_{IN}$ charges the first load capacitor 208 through the flying capacitor 204, and the second load capacitor 210 provides a negative driving voltage (ELVSS) to the OLED power management integrated circuit (IC) unit 101. The load resistor 209 is electrically connected to the first load capacitor 208, and the first load capacitor 208 is grounded via the first power stage ground component 1101.

Figure 3B:
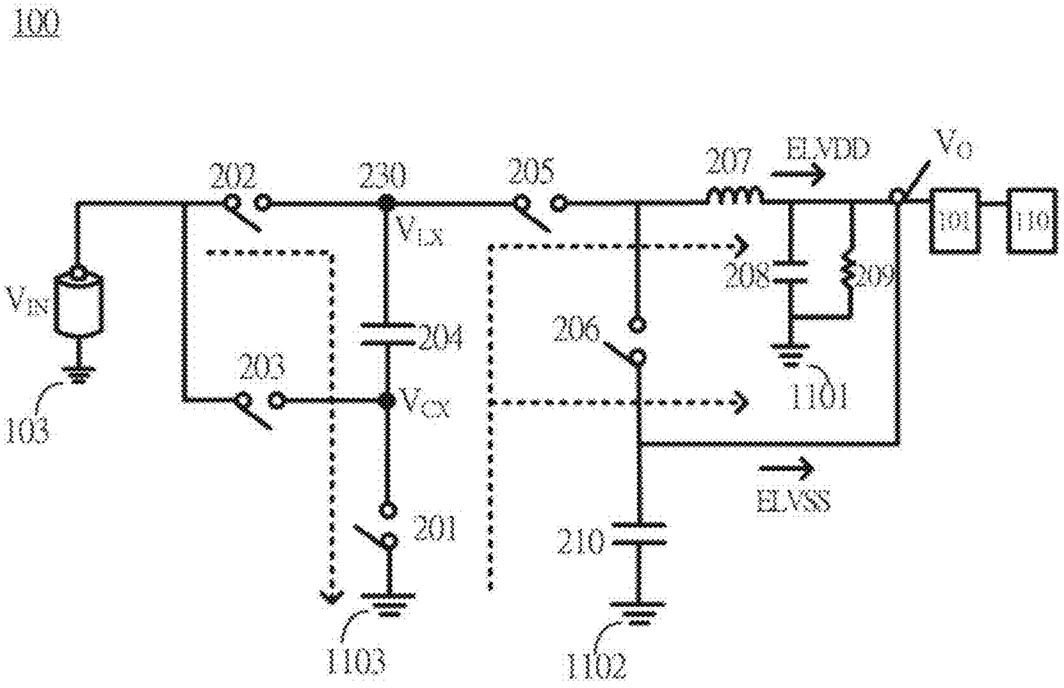
FIG. 3B is an architecture diagram of the boost converter power stage circuit of the present invention when the duty cycle is closed.

Still referring to FIG. 3B, which shows the architecture diagram of the boost converter power stage circuit 100 of the present invention when the duty cycle is closed. When the duty cycle is closed, the first power switch 201 is turned on, the second power switch 202 is turned on, the third power switch 203 is turned off, the fourth power switch 205 is turned off, and the fifth power switch 206 is turned on. The input voltage source $V_{IN}$ outputs a voltage 230 ($V_{LX}$) through the flying capacitor 204. By charging the flying capacitor 204, the second load capacitor 210 provides the inductor 207 to boost the positive driving voltage (ELVDD) of the output voltage $V_o$. By boosting the voltage of the inductor 207 to twice the voltage, the second load capacitor 210 provides a negative driving voltage (ELVSS) to the OLED power management integrated circuit (IC) unit 101.

The present invention provides a boost converter power stage circuit that uses an input voltage source to provide power supply. The input voltage source is electrically connected to a power stage ground component, which comprises an organic light-emitting diode (OLED) power management integrated circuit (IC) unit to provide power supply for OLEDs. The boost converter is electrically connected to the OLED power management integrated circuit (IC) unit and to the input voltage source, which is a direct current voltage source. The boost converter is used to provide a positive voltage for the OLED power management integrated circuit (IC) unit. The negative voltage is converted using a load capacitor for charging and discharging, using the output voltage to achieve the conversion of the negative voltage for use by the OLED power management integrated circuit (IC) unit.

It is understood that various modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A boost converter power stage circuit, an input voltage source providing power, wherein the input voltage source being electrically connected to a power stage ground component, comprising:

an organic light-emitting diode power management integrated circuit unit providing a power supply; and a boost converter, said boost converter being electrically connected to an input voltage source, said input voltage source being a direct current voltage source, said boost converter being used to provide for a positive voltage, and to provide for said organic light-emitting diode power management integrated circuit unit, a negative driving voltage through a first load capacitor and a second load capacitor for charging and discharging, wherein said first load capacitor is electrically connected to an inductor, said second load capacitor is electrically connected to a power switch, and said second load capacitor is grounded through a second power stage ground component, using an output voltage for being boosting to achieve a conversion of said negative driving voltage for use by said organic light-emitting diode power management integrated circuit unit.

2. The boost converter power stage circuit according to claim 1, wherein the boost converter further comprising:

a first power switch;

a second power switch;

a third power switch;

a flying capacitor;

a fourth power switch;

said fifth power switch; and said inductor, said inductor being electrically connected to said fourth power switch, and said fifth power switch, wherein said second power switch being electrically connected to said flying capacitor and said fourth power switch, said first power switch being electrically connected to said third power switch and said flying capacitor, said first power switch being grounded through a third power stage ground component, wherein said flying capacitor boosting a voltage of said inductor to twice said voltage, a positive driving voltage of said output voltage for being boosting, and, said second load capacitor is used for charging and discharging to achieve a conversion of a negative driving voltage.

3. The boost converter power stage circuit according to claim 1, wherein when a duty cycle being off, said first power switch being turned on, said second power switch being turned on, said third power switch being turned off, said fourth power switch being turned off, said fifth power switch being turned on, and said input voltage source outputting a voltage through said flying capacitor, by charging said flying capacitor, said second load capacitor providing a inductor with said positive driving voltage to output said output voltage for being boosting, by boosting a voltage of said inductor to twice a voltage, said second load capacitor provides said negative driving voltage to said organic light-emitting diode power management integrated circuit unit.

4. The boost converter power stage circuit according to claim 1, wherein, when a duty cycle being on, said first power switch and said second power switch being turned off, said third power switch being turned on, said fourth power switch being turned on, said fifth power switch being turned off, said input voltage source outputting a voltage through said flying capacitor to charge said first load capacitor, and said second load capacitor provides said negative driving voltage to said organic light-emitting diode power management integrated circuit unit.

* * * * *